Nov. 26, 1963   W. M. MAY ET AL   3,111,852
POWER DRIVE ASSEMBLY
Filed Aug. 6, 1959                    2 Sheets-Sheet 1

INVENTORS.
WALTER M. MAY &
ROBERT M. WEBSTER
BY
their ATTORNEYS.

INVENTORS.
WALTER M. MAY &
ROBERT M. WEBSTER
their ATTORNEYS.

Patent text

3,111,852
POWER DRIVE ASSEMBLY
Walter M. May, Allentown, and Robert M. Webster, Emmaus, Pa., assignors to Mack Trucks, Inc., Plainfield, N.J., a corporation of New York
Filed Aug. 6, 1959, Ser. No. 832,049
6 Claims. (Cl. 74—15.63)

The present invention relates to power drive assemblies, and, more particularly, to novel and improved power take-off means for auxiliary equipment.

Various forms of auxiliary power take-off devices have long been used in the art, appertaining to powered vehicles. For example, one well-known use of the power take-off involves a concrete mixing and carrying truck, in which power must be supplied from the prime mover for driving the vehicle and for operating the mixing and carrying tank. It is desirable to not only be able to provide the customary operation of the mixing and carrying tank when the vehicle is standing still, but it is also desirable to be able to selectively operate the mixing and carrying tank when the vehicle is in transit.

One form of power take-off assembly for this purpose that is known in the prior art involves the use of a drive shaft that is coupled at one end through a first clutch mechanism to the prime mover and at the opposite end by a second clutch mechanism to the main drive of the vehicle, the power take-off being from the interposed drive shaft. That type of assembly is subject to the very important disadvantage that at all times when the main drive is being driven by the prime mover, the power take-off is operating. There is no independent control for the two drives.

In power take-off assemblies which do not have a power take-off disconnect clutch, it is necessary to stop the engine in order to shift the auxiliary transmission that controls the various drum speeds.

In accordance with the invention, the above and other disadvantages are obviated by the combination with a drive assembly including a prime mover, a main driven means and an auxiliary driven means, of a main shaft means that serves to couple the prime mover and the main driven means and a transmission means that couples the auxiliary driven means to the prime mover and which is housed in a housing which is adapted to be selectively positioned in one of a plurality of angularly displaced positions about the longitudinal axis of the main shaft means in a plane transverse to the axis, thereby enabling the power take-off to be made from either side of the vehicle in the most suitable way dependent upon the vehicle characteristics, but at the same time utilizing standard engine, transmission and power take-off assemblies.

For a more complete understanding of the invention, reference may be had to the following detailed description taken in conjunction with the accompanying figures of the drawing, in which.

Figure 1:
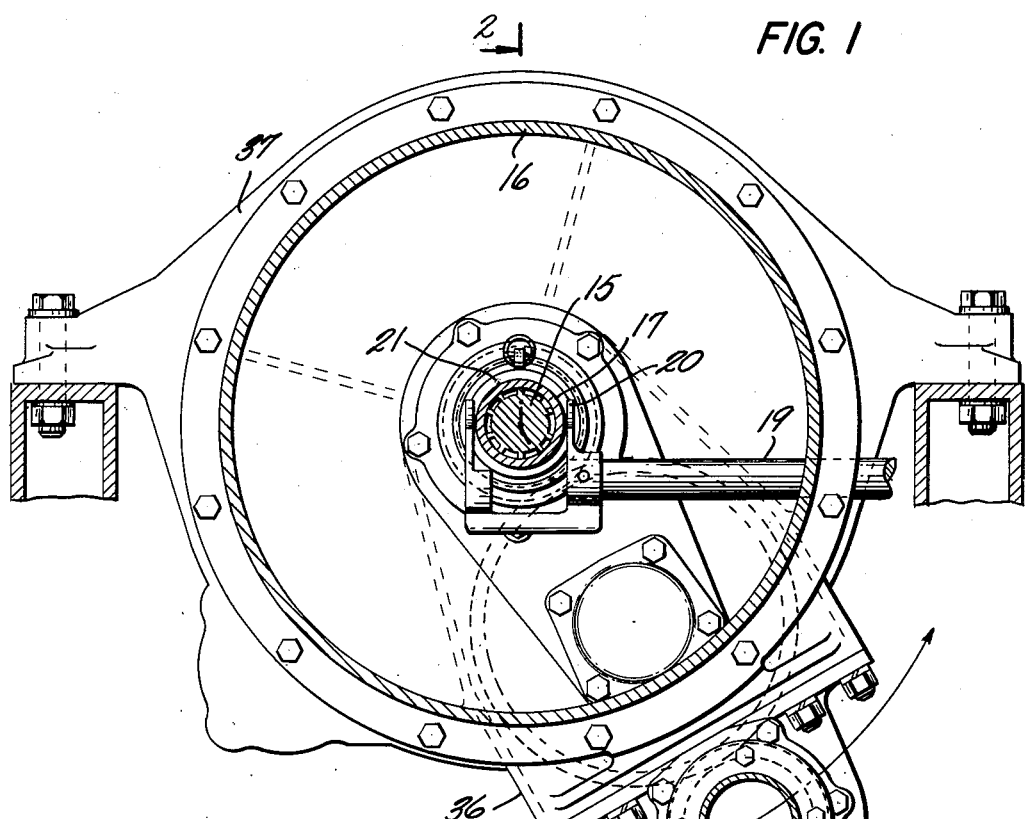
FIGURE 1 is an end view of the power take-off assembly and prime mover.

In the drawings, a crankshaft 10 of a prime mover (not shown) is bolted to a conventional fly-wheel 11 acting as the driving element of a clutch mechanism 12. A standard starting gear 13 is mounted on the periphery of the fly-wheel 11. The output plate 14, which may be of conventional form, of the clucth mechanism 12 is suitably mounted upon a splined stub shaft or drive pinion 15 constituting the main shaft means for coupling the prime mover and the main driven means. The drive pinion 15 leads rearwardly from the clutch mechanism 12 to a suitable conventional transmission (not shown), for example, disposed in a main driven means housing 16 and passes through a cylindrical sleeve 17 attached at its rearward end to the housing 16.

The clutch mechanism 12 is of a standard type biased to the engaged position by suitable springs, such as the spring within the spring housing 18. The clutch mechanism 12 is disengaged in a conventional manner by means of the rotation of a clutch operating arm 19 causing the forward movement of a clutch operating arm cam 20 to the forward position as shown by the dotted lines in FIG. 2. The forward movement of the clutch operating arm cam 20 bears against an inwardly extended release collar or spring-biased sleeve 21, which is slidably mounted axially of the supporting sleeve 17. Forward movement of the sleeve 21 causes the clutch operating mechanism shown generally at 22 to disengage the clutch plate 23 from the fly-wheel 11.

Figure 2:
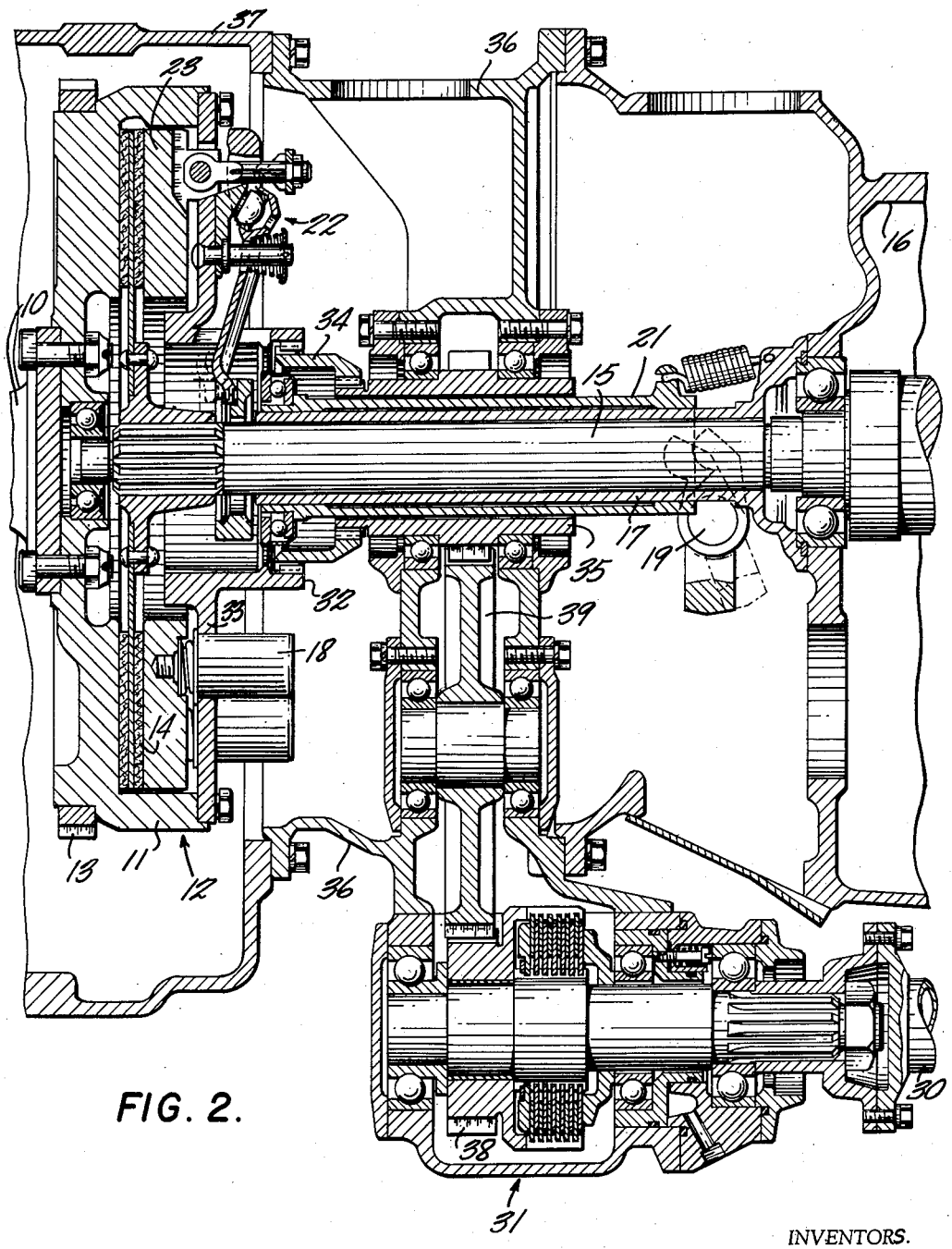
FIG. 2 is a partial sectional view taken along the line 2—2 in FIG. 1, looking in the direction of the arrows, showing the details in exemplary form of the power take-off assembly in accordance with the invention.

The auxiliary driven means is connected by a shaft 30 to a power take-off clutch mechanism 31, which may be of any suitable conventional form, such as the air-operated clutch shown in FIG. 2 of the drawing or a conventional electric clutch, for example. The power take-off clutch mechanism 31 is coupled through a geared transmission means to the fly-wheel 11. The geared transmission means includes an annular gear 32 mounted on a rearwardly extending boss of the back plate 33 of the clutch mechanism 12. The back plate 33 supports the springs 18 and the clutch operating mechanism 22 and is fixedly bolted to the fly-wheel 11.

Figure 3:
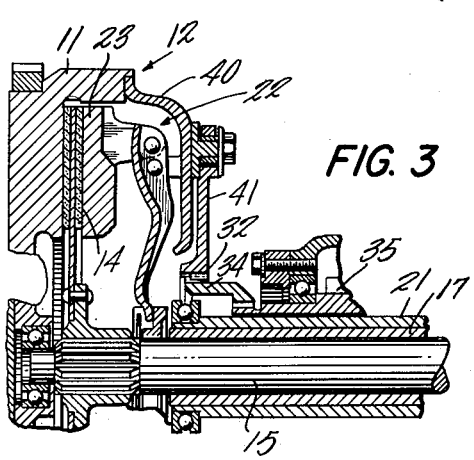
FIG. 3 is a partial sectional view showing an alternative construction to that in FIG. 2, in accordance with the invention.

Alternatively, if a spring cover 40 is employed, as shown in FIG. 3, an annular member 41 may extend radially outwardly from the annular gear 32 and be attached to the spring cover 40 in any suitable manner.

The gear 32 is in engagement with the outer peripheral teeth of a cup-shaped splined coupler 34 having internal and external teeth. The inner peripheral teeth of the coupler 34 are in driving engagement with cylindrical or sleeve-like gear 35 freely mounted about the sleeve 21 and supported by conventional bearings from the assembly housing 36 which is interposed between the main driven means housing 16 and the housing 37 of the prime mover.

The gear 35 in turn drives the input gear 38 of the power take-off clutch mechanism 31 through an idler gear 39, which is also supported by suitable bearings on the assembly housing 36. Thus the input of the clutch mechanism 31 is continuously driven by the prime mover independently of the clutch mechanism 12.

As shown in FIG. 1, the power take-off clutch mechanism 31 is mounted to one side of the axis of the stub shaft 15. If, because of the structural characteristics of the vehicle in which the power take-off is to be mounted, it is desirable to have the power take-off at some other angular position about the longitudinal axis of the main shaft means, all that is necessary is that the bolts mounting the assembly housing 36 on the housing 37 of the prime mover and the main drive means housing 16 be removed and the assembly housing 36 rotated to the required position, as indicated by the arrows in FIG. 1.

Thus, there has been provided, in accordance with the invention, a novel and improved power take-off assembly which can be controlled independently of the operation of the main driven means controlled by the prime mover and which may be selectively positioned in one of a plurality of angularly displaced positions about the longitudinal axis of the main shaft means in a plane transverse to that axis.

It will be obvious to those skilled in the art that the above described embodiment is meant to be merely exemplary and that it is susceptible of a wide degree of modification and variation without departing from the spirit and scope of the invention. For example, the main shaft means instead of being interposed between the main clutch and the transmission of the vehicle may be either directly coupled to the crankshaft of the engine or may be interposed between a fly-wheel coupled to the crankshaft of the engine and the main drive clutch. In the latter case, it may be desirable to use a flexible coupling between the fly-wheel and the main shaft means.

While the portion of the transmission means including the idler gear 39 is shown as being disposed in a vertical plane transverse to the axis of the stub shaft 15, it may be desirable for economy of space or for other structural considerations to have the gear train, leading from the gear mounted about the main shaft means to the power take-off clutch assembly, disposed at some other angle to the axis of the main shaft means through the use of conventional bevel gears. In some cases, the structural relation between the power take-off transmission means and the main shaft means may be such that the power take-off transmission means acts as a bearing load upon the main shaft means or it may be so designed as to be fully supported by fixed housing structure and not in load bearing relation to the main shaft means.

In cases where the main shaft means is directly coupled to the crank shaft of the engine, it may be desirable to directly gear the power take-off transmission means to the main shaft means, or it may be geared to a sleeve surrounding and splined to the main shaft means in either loaded or unloaded relation thereto.

Accordingly, it is deemed that the invention is not to be limited except as defined in the appended claims.

We claim:

1. In a drive assembly including a prime mover, a main driven means, and an auxiliary driven means, the combination therewith comprising first clutch mechanism coupled to said prime mover and having a driving element driven thereby, main shaft means interposed between said first clutch mechanism and said main driven means for coupling said prime mover and said main driven means through said first clutch mechanism, a housing interposed between said prime mover and said main driven means containing geared means mounted for free rotation about said main shaft means and coupling said first clutch mechanism driving element to said auxiliary driven means, said geared means operable in any one of a plurality of angularly displaced positions about the longitudinal axis of said main shaft means, supporting means for supporting said housing, and mounting means disposed about said main shaft means for attaching said housing to said supporting means in any one of said plurality of angularly displaced positions about said longitudinal axis of said main shaft means.

2. In a drive assembly including a prime mover, a main driven means, and an auxiliary driven means, the combination therewith comprising first selectively operable clutch mechanism coupled to said prime mover and having a driving element driven thereby, said main shaft means interposed between said first clutch mechanism and said main driven means for coupling said prime mover and said main driven means through said first clutch mechanism, an elongated sleeve means mounted about said main shaft means and axially movable relative to said main shaft means for selectively operating said first clutch mechanism, a housing interposed between said prime mover and said main driven means and containing transmission means including geared means freely mounted for rotation about said elongated sleeve means and coupling said first clutch mechanism driving element to said auxiliary driven means, said transmission means operable in any one of a plurality of angularly displaced positions about the longitudinal axis of said main shaft means, supporting means for supporting said housing, and mounting means disposed about said main shaft means for attaching said housing to said supporting means in any one of said plurality of angularly displaced positions about said longitudinal axis of said main shaft means.

3. In a drive assembly including a prime mover, a main driven means, and an auxiliary driven means, the combination therewith comprising main shaft means coupling said prime mover to said main driven means, a housing interposed between said prime mover and said main driven means and containing transmission means coupling said auxiliary driven means to said prime mover, said transmission means operable in any one of a plurality of angularly displaced positions about the longitudinal axis of said main shaft means, supporting means for supporting said housing, and mounting means disposed about said main shaft means for attaching said housing to said supporting means in any one of said plurality of angularly displaced positions about said longitudinal axis of said main shaft means.

4. Apparatus as recited in claim 3 wherein said transmission means includes geared means mounted for rotation about said main shaft means.

5. In the combination with a drive assembly as recited in claim 3, said transmission means including clutch mechanism contained within said housing.

6. In a drive assembly including a prime mover housed in a prime mover housing, a main driven means housed in a main driven means housing, and an auxiliary driven means, the combination therewith comprising main shaft means coupling said prime mover to said main driven means, an assembly housing interposed between said prime mover housing and said main driven means housing containing transmission means coupling said auxiliary driven means to said prime mover, said transmission means operable in any one of a plurality of angularly displaced positions about the longitudinal axis of said main shaft means, and mounting means coupled with said assembly housing and disposed about said main shaft means for mounting said assembly housing relative to said prime mover housing and said main driven means housing in any one of a plurality of angularly displaced positions about said longitudinal axis of said main shaft means.

References Cited in the file of this patent

UNITED STATES PATENTS

| | | |
|---|---|---|
| 1,372,045 | Sedgewick | Mar. 22, 1921 |
| 1,604,401 | Fisher | Oct. 26, 1926 |
| 1,874,261 | Evelyn | Aug. 30, 1932 |
| 2,168,033 | Johnson et al. | Aug. 1, 1939 |
| 2,287,279 | Stumpf | June 23, 1942 |
| 2,290,835 | Lorimor | July 21, 1942 |
| 2,445,828 | Heinsohn | July 27, 1948 |
| 2,513,333 | Keese et al. | July 4, 1950 |
| 2,680,377 | Gerst | June 8, 1954 |
| 2,723,569 | Ferguson et al. | Nov. 15, 1955 |
| 2,813,435 | Schumb | Nov. 19, 1957 |
| 2,906,137 | Bade | Sept. 29, 1959 |
| 2,910,882 | Wellauer | Nov. 3, 1959 |
| 3,004,438 | Funk | Oct. 17, 1961 |